Sept. 9, 1952          M. MALLORY          2,610,096
APPARATUS FOR LUBRICATING SHAFTS
Filed Feb. 14, 1949
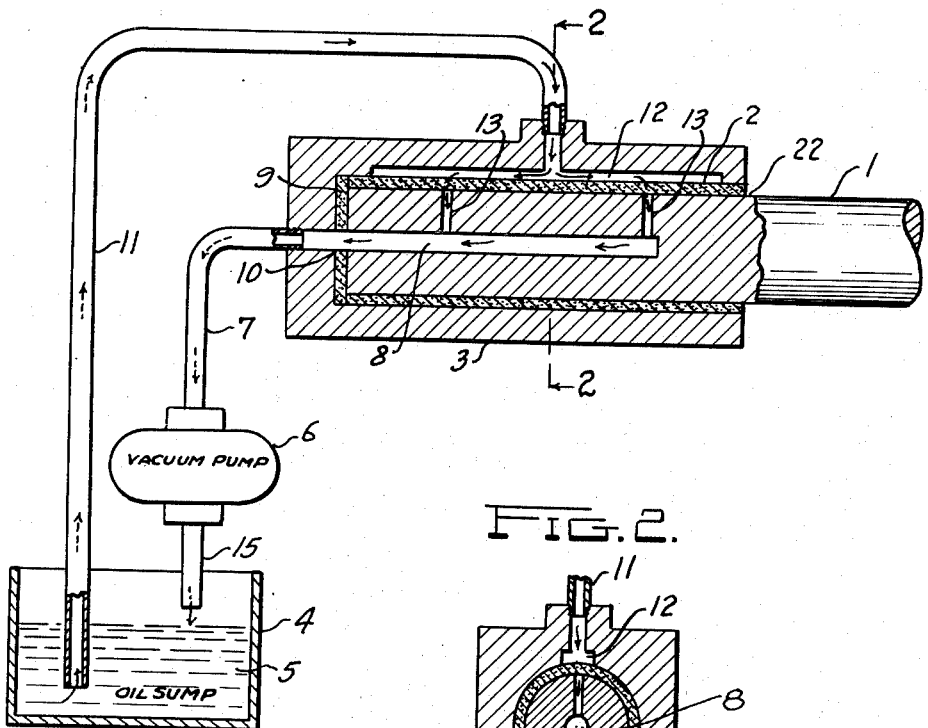
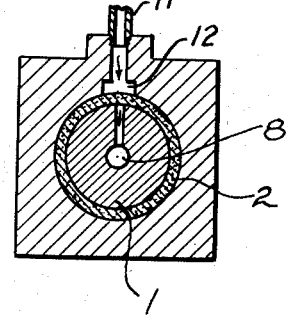
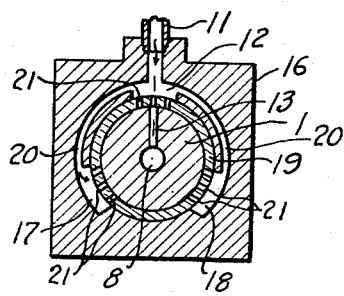
INVENTOR.
Marion Mallory
BY
Barnes, Kisselle, Laughlin & Raisch
ATTORNEYS Patented Sept. 9, 1952

2,610,096

UNITED STATES PATENT OFFICE 2,610,096

APPARATUS FOR LUBRICATING SHAFTS

Marion Mallory, Detroit, Mich.

Application February 14, 1949, Serial No. 76,356

6 Claims. (Cl. 308—121)

This invention relates to an apparatus for lubricating shafts.

It is common practice to lubricate shafts by forcing oil or other lubricant under pressure through the bearing for the shaft. This manner of lubricating is disadvantageous because the lubricant is frequently forced out of the ends of the shaft or bearing and lost.

It is an object of this invention to produce an apparatus for lubricating a shaft and bearing which is simple and economical in operation and which will avoid loss of lubricant by leakage through the ends of the shaft or bearing and the disadvantages which result from such leakage.

Fig. 1 is an illustrative showing of an apparatus for lubricating shafts according to my method.

Fig. 2 is a section along the line 2—2 of Fig. 1.

Fig. 3 is a section corresponding to Fig. 2 of a modified form of my apparatus.

Referring more particularly to the drawings it will be seen that my apparatus comprises the following elements: rotary shaft 1 journalled in porous bearing 2, bearing support and housing 3, sump 4 which holds a reserve of lubricating oil 5, vacuum pump 6 the low pressure or vacuum side of which is connected by pipe line 7 with axial passageway 8 in shaft 1. The end of shaft 1 is sealed by leather seal 9 having a central opening 10 therein which communicates with the adjacent ends of pipe line 7 and passageway 8. Oil pipe line 11 connects sump 4 with elongate distributor passageway 12 in housing 3. Shaft 1 is provided with a plurality of radial branch passageways 13 which extend between passageway 8 and the surface of shaft 1.

The operation of my lubricating system is as follows: Vacuum pump 6 creates a vacuum or sub-atmospheric pressure in line 7, passageway 8 and branch passageways 13 which communicate through porous or otherwise foraminated bearing 2 with distributor passageway 12 and line 11. This causes oil to be drawn from sump 4 through line 11, distributor 12 and through porous bearing 2 where it is distributed throughout the bearing surface area between bearing 2 and shaft 1 and then drawn through branch passageways 13, passageway 8 and line 7 to pump 6 and then discharged through line 15 into sump 4. Since shaft 1 rotates, the branch passageways 13 will cause the vacuum or suction to be applied circumferentially about the inside of bearing 2 and the location of passageways 13 will be such that the coil or other lubricant will be drawn through porous bearing 2 and uniformly distributed throughout the bearing surface area between bearing 2 and shaft 1. Since bearing 2 is under a vacuum or subatmospheric pressure, the oil will not leak out of the ends of bearing 2 but will always be drawn through passageways 13, 8 and 7 by pump 6 into the sump 4.

Although I have shown bearing 2 as a so-called porous oilless bearing, I can apply my arrangement of lubricating by vacuum to solid bearings provided the bearing has holes or grooves through or in it to permit the oil to be drawn to the active bearing surface. The important point is that the surfaces of the bearing and shaft in lubricated bearing contact should be under vacuum so that the flow of lubricant is inwardly from the ends of the bearing surface area rather than outwardly as in the case of pressure lubricated bearings. I have illustrated such type of solid bearing in Fig. 3. In this form of the invention the bearing housing 16 is provided with the distributor passageway 12 and two additional passageways 17 and 18 which extend axially along the outside of solid bearing 19 and communicate with the main distributor passageway 12 by passageways 20. Solid bearing 19 is provided with a plurality of holes 21 therethrough in the area between each passageway 12 and shaft 1. Solid bearing 19 is lubricated in the same manner as porous bearing 2. The suction or vacuum applied to passageways 8 and 13 in shaft 1 draw oil from sump 4 through pipe line 11, distributor passageways 12, 17, 18 and holes 21 to the effective bearing surface area between shaft 1 and the inner face of bearing 19 where the oil effectively lubricates the bearing. The surplus oil is drawn through branch passageways 13 and passageways 8 and 7 to pump 6 which returns the excess oil through line 15 to sump 4. Thus, there is no tendency for the lubricant to leak out the end 22 of the bearing surface area because the outside atmospheric pressure will always be higher than the subatmospheric pressure in passageways 13 and 8 which tends to draw the lubricant inwardly from the open end 22 of the bearing surface area. It is, of course, appreciated that the location of passageways 8 and 13 is illustrative and that the number of passageways 13 can be decreased and, if desirable, these branch passageways can be located nearer to the end 22 of the bearing surface area.

My apparatus for lubricating a bearing is very useful for lubricating the bearings on automotive vehicles, such as trucks and buses. Although shaft 1 has been illustrated as a rotary shaft, it will be appreciated that my arrangement for lubricating is not limited in use to rotary shafts.

I claim:

1. In combination a bearing, a rotary shaft carried in said bearing, a source of lubricant, a source of vacuum, a passageway connecting said source of lubricant with the bearing surface of said bearing, an axially extending passageway in said shaft, and at least one branch passageway in said shaft communicating at one end with said axial passageway and at the other end with the surface of said shaft, said axial and branch passageways connecting said source of vacuum with said bearing surface whereby the lubricant is drawn from said source of lubricant to said bearing surface to lubricate the same and then drawn from said bearing surface through said branch and axial passageways to said source of vacuum.

2. The combination claimed in claim 1 wherein a lubricant distributing passageway is provided along the outside of said bearing.

3. The combination claimed in claim 2 including a housing in which said bearing is supported and wherein the lubricating distributor passageway is located in said housing adjacent to the outer surface of said bearing.

4. The combination claimed in claim 3 wherein the bearing is a permeable porous bearing.

5. The combination claimed in claim 4 wherein the bearing is a porous sleeve bearing and the said shaft is provided with a plurality of axially spaced branch passageways.

6. The combination claimed in claim 5 wherein the first mentioned passageway connects the source of lubricant with the outer face of said bearing and wherein the axial and branch passageways connect the source of vacuum with the inner face of said bearing whereby the lubricant flows radially inwardly through said bearing to the bearing surface.

MARION MALLORY.

REFERENCES CITED

The following references are of record in the file of this patent:

UNITED STATES PATENTS

| Number | Name | Date |
| --- | --- | --- |
| 1,634,768 | Bonner | July 5, 1927 |
| 2,299,119 | Yeomans | Oct. 20, 1942 |
| 2,402,467 | Thompson | June 18, 1946 |

FOREIGN PATENTS

| Number | Country | Date |
| --- | --- | --- |
| 423,474 | Great Britain | Feb. 1, 1935 |